Dec. 27, 1938.  H. S. LENHART  2,141,920
CONVEYING APPARATUS
Filed May 22, 1937   3 Sheets-Sheet 1
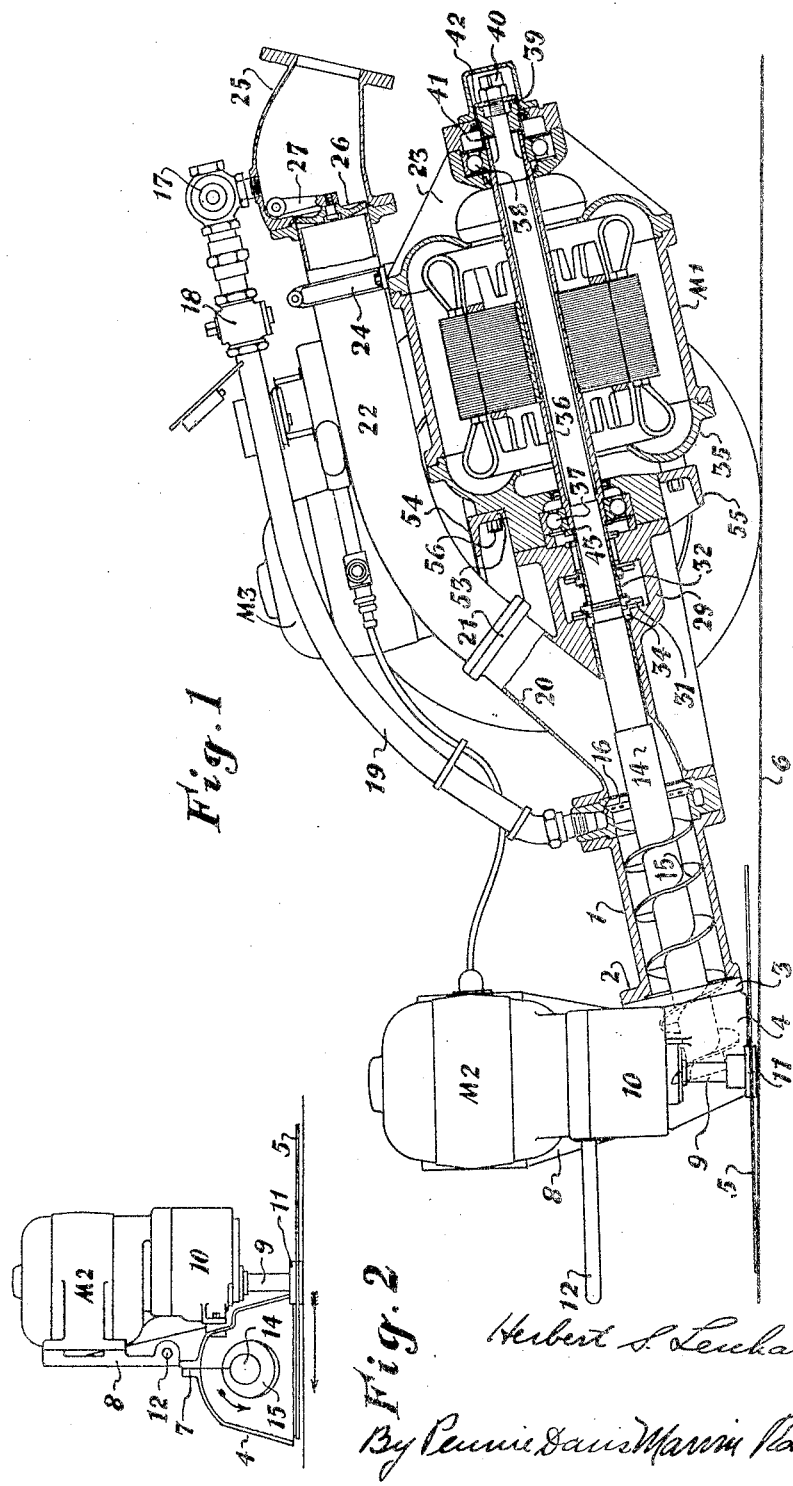

Dec. 27, 1938. H. S. LENHART 2,141,920
CONVEYING APPARATUS
Filed May 22, 1937 3 Sheets-Sheet 2
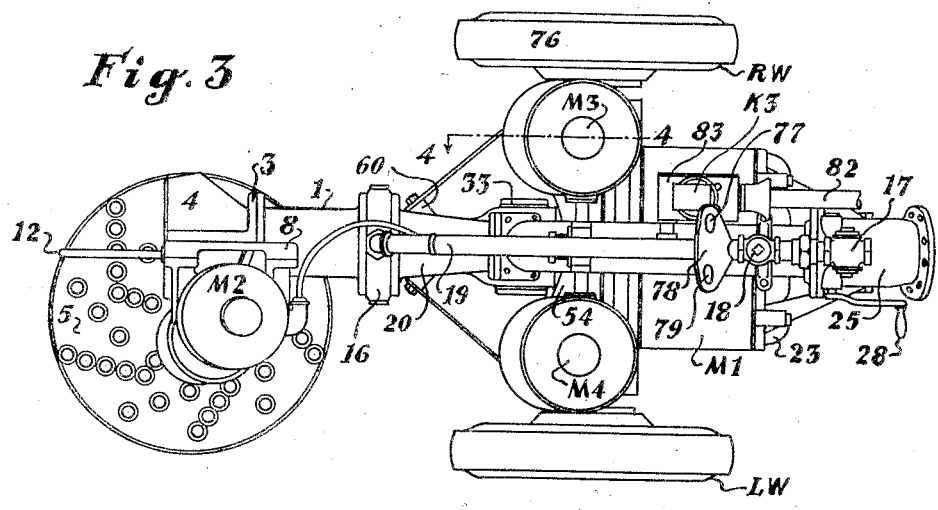
Fig. 3
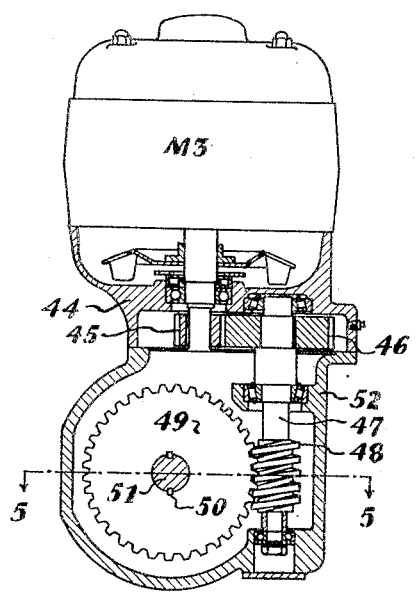
Fig. 4
Fig. 5

Dec. 27, 1938.  H. S. LENHART  2,141,920
CONVEYING APPARATUS
Filed May 22, 1937  3 Sheets-Sheet 3

Inventor
Herbert S. Lenhart
By Pennie Davis Marvin Edmonds
Attorney

Patented Dec. 27, 1938

2,141,920

UNITED STATES PATENT OFFICE 2,141,920

CONVEYING APPARATUS

Herbert S. Lenhart, Allentown, Pa., assignor to Fuller Company, a corporation of Delaware Application May 22, 1937, Serial No. 144,271

7 Claims. (Cl. 302—17)

This invention relates to conveying apparatus for dry pulverulent materials and more particularly to a portable conveyor or pump for unloading materials from box-cars and barges, and for reclaiming materials from the floors of warehouses. The apparatus is especially intended to handle Portland cement, but may also be employed as a conveyor of pulverized limestone, lime, soda ash and other materials having similar physical characteristics. The pump is used in conjunction with the usual pipe-line system, the initial part of which is flexible, to permit a desired radius of movement. This application is a division of my co-pending application, Serial No. 93,555, filed July 31, 1936, in which the supporting wheels, their driving mechanism and control devices are more fully described, and claimed.

The apparatus of the invention constitutes an improvement of that of Morrow Patent No. 1,890,298, and to a lesser extent, the patent referred to therein. The improved apparatus offers a wider field of utility; greater material handling capacity, the convenience, flexibility and safety of operation by remote control; simplified mechanical construction, and decreased liability to accidental stoppages.

The operation of the Morrow apparatus is well-known in this art particularly through its use in handling cement during the construction of concrete structures. The cement is fed to the barrel of the pump by a slowly rotating, perforated disc, the disc serving also to break down the compacted cement and to recover it over a relatively wide area. The perforations permit the cement to pass through the disc, so that the disc will be maintained substantially parallel to the floor. A rapidly rotating impeller screw, filled to its maximum capacity by the feed disc, advances the cement through the barrel, the cement being compacted as it is advanced by the effect of screw flights of decreasing pitch, to form a "seal" to resist a backward flow of air along the screw shaft. The seal density is usually augmented by a space between the terminal flight of the screw and the orifices or "air-ring", through which compressed air is admitted to the barrel. The length of this space is variable, usually by making the screw shaft axially adjustable. The shaft is directly driven by a motor, the rotor of which is secured to a bushing through which the shaft passes.

Beyond the air ring, the barrel opens into an elbow, which by-passes the screw shaft and motor, the elbow leading to the transport pipe line.

The pipe line comprises an initial section, at least, of reinforced rubber hose, of sufficient length to permit the desired radius of movement of the pump, the remainder of the system being ordinarily black steel pipe.

The apparatus is supported for movement upon two wheels far enough in the rear of the center of balance of the pump, to overcome the drag of the hose and to maintain the apparatus tilted forwardly to rest upon an extension of the feeder shaft below the disc. The wheels are driven through power take-off and speed-reduction gearing, driven by the screw shaft, the wheels being arranged to be driven independently in either direction through separate pairs of clutches, one forward and one reverse, of the band type. Power is transmitted to the feed disc through a portion of the same gear train and additional shafting and speed-reduction mechanism. The operator controls the movement of the apparatus by the manipulation of levers which cause the clutches to be engaged.

This arrangement limits the capacity of the pump to handle materials, the distance over which they may be conveyed, or both, as the power to move the pump and to drive the feed disc is also derived from the screw shaft motor. The limited motor power remaining available for pumping is further considerably decreased by the power transmission losses of the complicated system of gearing and clutches. Overloading is cumulative. When the cement is densely compacted, and slides descend upon the feed disc and overload both the latter and the screw, the operator first attempts to withdraw the pump, which involves a further overload to an already overloaded motor, thereby increasing the possibility of stalling the apparatus, with the final result that the operator must remove the cement before the machine can again be started.

These and other disadvantages are overcome in the present apparatus, principally because the screw shaft motor is employed solely for pumping. It is among the purposes of the invention to employ continuously the maximum available motor power with respect both to volume of material and the distance of conveying. It is a further purpose to maintain the delivery of material substantially at a constant maximum rate by permitting the operator to force the operation, as the necessity for rearward movement, in anticipation of slides, and stoppages due to overloads are eliminated by the provision of positive means to prevent overloads exceeding a predetermined safe loading, whereby the pump will function efficiently even though it may be buried entirely under a slide of material.

The pump is preferably operated under remote control so that the operator can cause it to advance into the stored material to maintain it under full load; to permit him to leave the pump while it is in operation so that he may sweep or otherwise clean the floor of the residue of material; to permit the operator to control the pump from a safe distance, when recovering cement from piles in a storage warehouse, and to prevent damage to the apparatus due to careless operation.

In general, the new apparatus comprises a pumping assembly, substantially similar but considerably simpler than that of the Morrow patent. The feed disc is driven by a separate motor through speed-reduction mechanism, the operation of the motor being controlled within a predetermined range of loading of the screw motor. The feeder motor stops before the screw motor is dangerously overloaded and starts again when the load drops to a safe or normal load. This control is automatic and preferably comprises an adjustable, instantaneous overload relay in the screw motor circuit, the relay releasing the starter of the feeder motor. The circuit is so arranged that the feeder motor will start simultaneously and automatically when the screw motor circuit is closed, and will continue to drive the disc and thereby maintain the pump at its maximum operating capacity provided the screw motor is not overloaded beyond a predetermined degree. As it is one of the purposes of the feeder to fill the screw to its maximum capacity, in order that a "seal" may be formed within a barrel of relatively short length, the present arrangement permits the maintenance of a uniform seal of the proper density. It will be understood that it is essential that the pump be of relatively short length to permit movement in a restricted space such as the interior of a box-car. Further, the seal of the pump must be of sufficient density to maintain itself when the material to be conveyed is relatively free-flowing, but when slides of densely packed material descend upon the disc and move into the barrel, the screw motor, in the absence of the feeder motor relay circuit, would be overloaded considerably beyond the normal load represented by the normal rate of delivery and the distance of conveying, the screw motor being more liable to overload when the conveying distance is of considerable length.

The present arrangement not only overcomes the liability of stoppages, but also takes advantage of the slides of material to maintain operation continuously at the safe maximum conveying capacity of the pump. The instantaneous overload relay serves, in such cases, to stop the feeder until the excessive flow decreases to a normal operating load, at which time the power input to the screw motor has decreased and the starter of the feeder motor is again closed by the release of the relay. The overload relay is preferably of the adjustable type, whereby the stopping and re-starting of the feeder motor may be controlled within a predetermined range for any operating condition, in accordance with the capacity characteristics of the screw motor. This arrangement overcomes the principal capacity limitation of the Morrow pump, not only because the entire power of the screw motor is made available for pumping, but because the screw can be kept filled continuously, and it is no longer necessary to withdraw the pump in anticipation of a slide, and when the load upon the feed disc is added to the already overloaded screw motor.

The discharge elbow opens into a conduit passing centrally between the wheel driving motors, the end of the conduit being supported upon the rear end-bell of the screw shaft motor, to elevate the hose and centralize and decrease its dragging effect.

All of the motor starters are preferably secured to a panel in a dust-proof casing which may be located at any convenient point, the power circuits to the pump preferably being included in a single cable paralleling and secured to the transport hose. Each of the wheel driving motors is provided with a reversing starter, whereby the motors may be independently driven in either direction, either together to cause the pump to advance or withdraw, or oppositely to cause the pump to turn on a substantially fixed pivot.

The actuating circuits for the starters for the screw and wheel motors preferably form a cable leading from the casing, the cable terminating in a switch assembly which may conveniently be carried by the operator. No separate circuit and switch is required for the disc feeder motor starter since it operates automatically in conjunction with that of the screw motor through the relay previously described. The switch assembly is preferably enclosed within a grounded handle and includes a switch for controlling the screw motor starter and a normally open pushbutton in the wheel motor starter circuits, held in closed position by the operator when he desires to move the pump.

Compressed air is supplied through the usual flexible hose, paralleling and usually secured to the transport hose, to a connection to the air ring. A pressure actuated switch, of the conventional diaphragm type, may be conveniently supplied from this connection, the switch being connected in the screw starter circuit, so that the operator cannot start the pump before turning on the air supply, the switch also serving to stop the pump and the feeder automatically if the air pressure falls below a predetermined point or the supply fails, although the driving wheels can be moved if this occurs.

For a better understanding of the invention reference is made to the accompanying drawings in which:

Fig. 1 is a side elevation partly in section;

Fig. 2 is a detail, in front elevation, of the feeder assembly, showing its relation to the impeller screw;

Fig. 3 is a plan view on a slightly reduced scale;

Fig. 4 is a detail, in partial vertical section, of the right-wheel driving assembly, on line 4—4 of Fig. 3;

Fig. 5 is a sectional detail, in plan, on line 5—5 of Fig. 4;

Figures 6, 7:
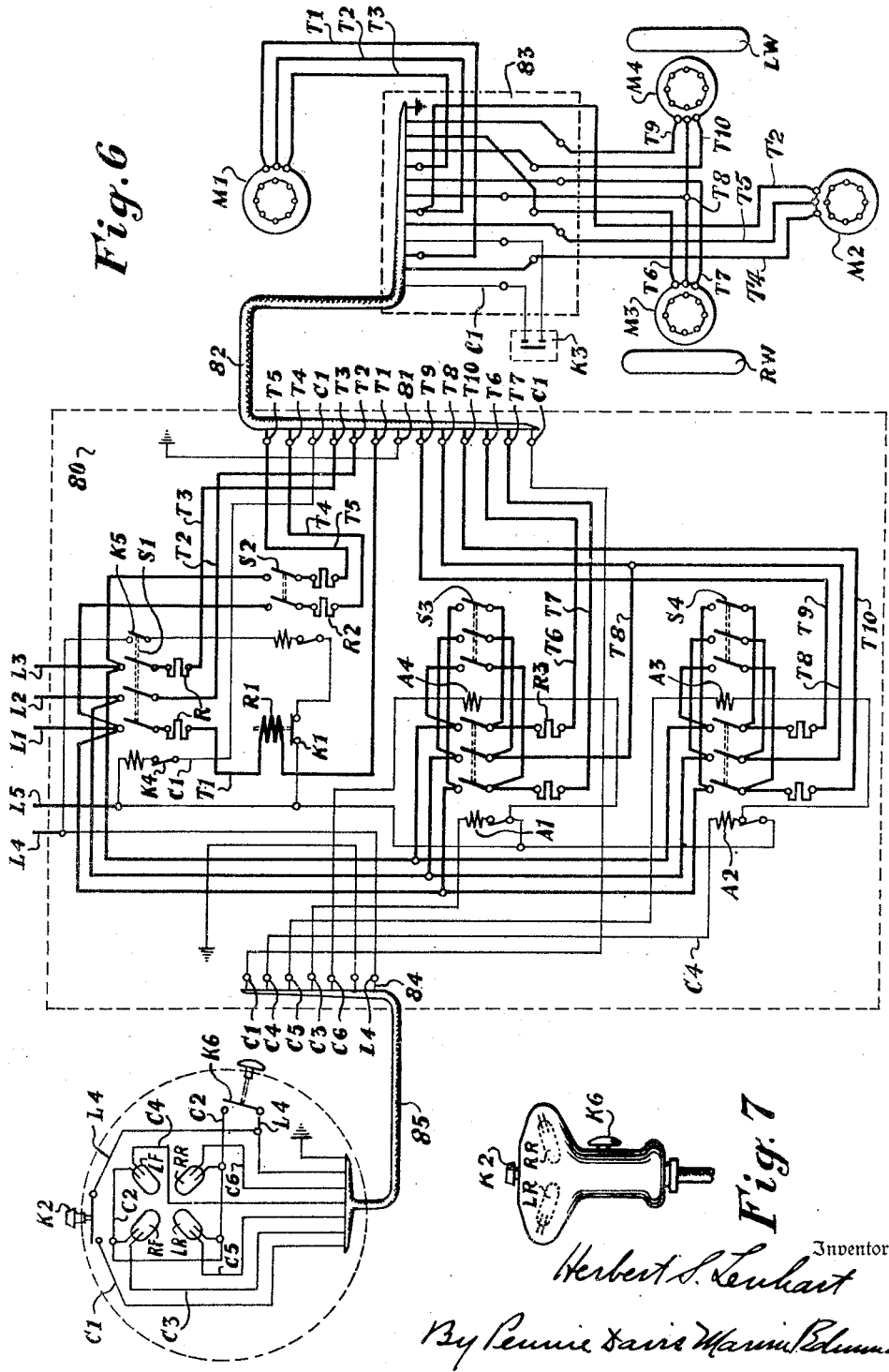
Fig. 6 is a schematic wiring diagram of the power and control circuits.
Fig. 7 is a side elevation of the handle enclosing the control switch assembly.

Referring to the drawings, and first to Figs. 1, 2 and 3, the apparatus will be seen to consist of a pump casing or barrel 1, provided with a flange 2 at its inlet, to which a similar flange 3 of the hood 4 is secured, the latter being open at the bottom and flared outwardly to span one side of a feed disc 5, as shown in detail in Fig. 2. The feed disc is approximately parallel with the floor, indicated by the line 6, upon which the material to be conveyed is stored, but is tilted forward slightly to leave a minimum residue of material on the floor. The hood 4, is preferably formed of two sections, suitably flanged as at 7, and to which is secured a support 8, for the feed disc driving assembly which includes a motor M2, preferably of the totally enclosed, ball bearing, squirrel cage, induction, elevator type. This motor may have a speed of 1125 R. P. M. and drives the feed disc 5 through a shaft 9 and a built-in speed reducer 10, preferably of the double parallel, geared head type, having a total reduction ratio of 33.5:1, to drive the shaft 9 at a speed of 33.6 R. P. M., the shaft 9 being secured to the disc 5 by suitable flanges 11, the latter being secured by the usual rivets (not shown), the lower flange supporting the disc 5 out of actual contact with the floor. Contact with the walls of a car or other enclosure is prevented by means of rod 12 which may conveniently be secured to the support 8, the rod also serving to penetrate the material and break down the face of the pile.

An impeller screw 14, provided with flights 15, is arranged concentrically within the barrel, in the usual manner, with preferably at least one complete flight section within the hood 4, the leading edge of the flight being thus arranged to receive the maximum load carried by the feed disc 5. The pitch of the screw flights decreases, in the usual way, toward the terminal flight, and the latter is spaced from the point of air admission, indicated generally as the air-ring 16, the barrel being flanged and secured to the air-ring in the usual manner. Compressed air for rendering the material fluent may be injected through the air-ring from any suitable source of supply, represented by the three-way cock 17, to which the usual flexible hose is secured, the cut-off cock 18 and the pipe-line 19, the cock 18 serving as an orifice plate of variable size to control the volume flow of air.

Secured to the barrel 1 beyond the air-ring 16, is an off-set discharge elbow 20 suitably flanged at 21, and connected to a portion of the conduit 22 arranged centrally of the apparatus and forming an extension of the elbow, the conduit being supported by the rear end-bell 23 of the screw shaft driving motor M1, as indicated at 24. A non-return valve 25, of the gravity type, is secured to the conduit beyond the support 24, the valve including a flap-valve 26, carried by a crank 27, the crank being secured to a rod terminating in a crank 28, shown in Fig. 3. This valve is lifted from its seat by the flow of material, and closes when the flow stops. If the pump is to be stopped for a considerable time, sufficient to permit the air to escape from the aerated material, the operator opens the cock 17 to cause air at the full available volume to flow into the valve and system to move the material and clear the pipe-line while the material is still in a fluent state. The pressure of the air thus admitted holds the valve 26 against its seat, thereby providing a dead-end to prevent a flow of air through the barrel 1, and a consequent dust nuisance.

The screw shaft 14 extends through a wall of the elbow 20 and a housing 29, formed as an integral part thereof, the housing enclosing an oil seal 31 preferably of the double fixed and rotating ring type, the rotating rings being longitudinally movable on a short bushing 32 surrounding the shaft, so that the seal assembly, including the bushing 32, can be removed as a unit, after the shaft 14 has been withdrawn, through a port 33 in the side of the housing, shown in Fig. 3. The housing is chambered at 34 and supplied with air through suitable tubing from the connection 19, to provide the usual counter-current to prevent dust from entering the shaft opening in the wall of elbow 20 and moving along the shaft, the oil seal 31 forming a dead-end. The housing 29 is secured to the forward end-bell 35 of the motor M1, the shaft passing through a bushing 36 to which the rotor of the motor M1 is keyed, in the usual manner. The bushing 36 is supported for rotation in a radial and thrust bearing 37 arranged in a chamber in the forward end-bell 35 and a radial bearing 38, similarly arranged in the rear end-bell 23. Beyond the bearing 38, the shaft 14 is secured to the bushing by a key-ring 39 which surrounds a reduced section of the shaft 14, the key-ring being secured by a nut 40, the latter being spaced from the key-ring by one or more washers 42, the function of which is to permit longitudinal adjustment of the shaft 14 to modify the "seal" distance between the terminal flight and the air-ring 16. The inner race of bearing 38 is held in place by a spacer 41 abutting a shoulder on key-ring 39. As the normal thrust of the material advanced by the screw maintains the shaft under tension, the inner race of bearing 37 is engaged by a shoulder formed on the bushing, the race being restrained from forward movement by a lock-washer and nut 43.

As will be seen in Fig. 3, the driving assemblies for the left wheel LW and the right wheel RW are similar and the driving motors M3 and M4 are identical and only one assembly will be described in detail. Referring to Fig. 4, the motor M3 is provided with a geared head 44 including the pinion 45 and gear 46, the latter being suitably keyed to the worm shaft 47, the shaft being supported in suitable anti-friction bearings. Shaft 47 drives the worm 48 which engages a worm gear 49, the gear being keyed as at 50 to the axle 51. The geared head 44 is secured to an upper flange of a gear case 52, the gear case being formed as an integral part of a yoke 53 (Fig. 1), having an upper web 54 and a lower web 55, the yoke having a central, circular opening surrounding the forward section of end-bell 35, and being secured thereto by cap-screws 56, as shown in Fig. 5. The yoke 53 is also provided with an angular boss 57 (Fig. 5) to which a brace 58 may be secured by a cap-screw 59, the other end of the brace being secured to a similar boss 60, shown in Fig. 3 at the side of the elbow 20 near the air-ring 16.

The axle 51 is semi-floating, and its inner end is supported for rotation in a radial bearing 61, the latter being secured by the usual lockwasher and nut and separated from the worm gear 49 by the spacer 62. The gear case 52 is enclosed by the cover 63, the latter being chambered to receive a radial and thrust bearing 64, the inner race of which is secured to the axle 51 by the lockwasher and nut 65, the outer race of the bearing being held by the retainer 66. Beyond the retainer, the shaft is surrounded by a bushing 67, which receives the wheel hub 68, the latter carrying a disc wheel 69, which may be of the "Ford" truck type, the disc being secured by stud bolts 70. Cap screws 71 pass through a hub cap 72 and secure it to the hub 68. The hub cap is keyed to the shaft at 73 and secured by the usual nut 74. The wheel 75 is preferably provided with a pneumatic tire 76 of the heavy duty, truck type in order to obtain sufficient traction when the pump is moved against the face of a pile of material when the floor has not been entirely cleaned.

The power and control circuits for the four motors are illustrated schematically in Fig. 6. For simplicity, the motors are indicated as three-wire machines, but it will be realized that as pumps of this type are frequently moved from one installation to another in construction work, nine-wire motors would actually be employed, so that they may be connected in accordance with the voltage characteristics of the current available. It will be assumed, for example, that the pump is of common size having screw flights of 6" diameter, the screw shaft being driven by motor M1 of 40 horsepower, 1125 R. P. M., 440 volt, 60 cycle, 3 phase squirrel cage, induction, vertical type, the rotor and starter frames being standard commercial design. The motor M2, M3 and M4 are 2 horsepower, 1125 R. P. M., totally enclosed, ball bearing, squirrel cage, induction, elevator type, 440 volt, 60 cycle, 3 phase. The control circuit may be supplied with alternating current at 110 volts, 60 cycle, for the sake of safety.

The 440 volt power lines for the four motors are represented by the lines L1, L2 and L3, the 110 volt lines supplying the starter actuating circuits being represented by lines L4 and L5. A full voltage magnetic starter S1 controls the operation of the screw shaft motor M1, the starter being provided with usual contacts for energizing motor circuits T1, T2 and T3. These circuits include two thermal overload relays indicated generally at R. Circuit T1 includes an adjustable, instantaneous overload relay R1, of the type actuated by a solenoid and released to close the contacts by gravity, the relay having contacts K1 in the actuating coil circuit of starter S2 for motor M2. This starter is likewise of the full voltage, magnetic type and is provided with similar thermal overload relays R2, in the circuit of the feeder motor M2, the circuits being represented by the lines T4 and T5 and common wire T2, the starter having only two contacts as the circuit through the common wire is closed by starter S1. Starter S3 controls the right wheel motor M3 and may conveniently be a reversible full voltage, magnetic starter having two sections of three contacts each, for energizing the motor through the usual circuits T6, T7 and T8 and the thermal overload relays R3. The starter S3 preferably includes the usual mechanical interlocks so that the closing of one section prevents the closing of the other.

Left wheel motor M4 is controlled by starter S4, this starter being identical to starter S3, and having equivalent circuits represented by the lines T9 and T10, and the common line T8.

The actuating circuits for the four starters are as follows:

Starter S1, for the screw shaft motor M1, is actuated by a maintaining contact switch K2, the latter forming a part of a portable switch assembly, shown in Fig. 7; the contacts of this switch close the power supply line L4 and control circuit line C1, this line including an air-pressure actuated switch K3, and an overload relay switch K4, the latter forming a part of thermal overload relay R, the circuit being completed to power supply line L5, through the actuating coil of the starter.

Closing of the maintaining contact switch K2 closes the starter S1, and simultaneously, the closing of auxiliary contacts K5, forming a part of the starter, closes the low voltage supply, through line L4 to the actuating coil of starter S2, the opposite side of the actuating coil of starter S2 being fed by the normally closed contacts K1 of the instantaneous overload relay R1, to close starter S2 simultaneously with starter S1, whereby both the screw shaft motor M1 and the feeder motor M2 will be started together.

The closing of starter S1 is only possible when the pressure switch K3 is closed. This switch is of the conventional diaphragm type and may conveniently be connected to the air supply through suitable tubing from the connection 19. Should the air supply pressure to the air-ring 16 drop below a predetermined point, or fail entirely, this switch will open, de-energizing the actuating coil and releasing starters S1 and S2 causing the pump to stop before un-aerated material is forced into the conduit 22.

The instantaneous overload relay R1, referred to above, is of the adjustable type including the usual solenoid, plunger and dash-pot, and experience has shown that the most satisfactory relay is one actuated at about 150% of full load, at which time it will open the contacts K1, thereby releasing starter S2, to stop the feeder motor M2, when screw shaft motor M1 is overloaded beyond the setting of the relay R1. It has also been found desirable to cause the contactor of the relay to fall, by gravity, when the load of motor M1 drops to about 125%. It is to be understood that this range of operation is not critical and may be adjusted to suit the characteristics of the screw shaft motor, but that this range has been found to be satisfactory for a general purpose, squirrel cage induction motor.

The circuits for actuating the starters of the wheel motors M3 and M4 are closed by switches preferably of the mercury contact type, the latter being assembled in a housing in the form of a handle, as illustrated in Fig. 7. In Fig. 6, these switches are shown in plan in the positions actually occupied in the handle, the switches being marked for simplicity RF and LF, representing right-wheel forward and left-wheel forward, and LR and RR, representing left-wheel reverse and right-wheel reverse. Each of these switches is tilted about 15 degrees from the horizontal with the contacts elevated to keep the circuits open when the handle is held vertically, with the switch K2 upward.

There are four normal and four intermediate directions for tilting the handle. The operator normally faces the pump and holds the handle in front of him in the upright or normal position, with the switches in the horizontal position shown diagramatically in plan in Fig. 6. By tilting the handle forwardly from this position, circuits will be closed through the switches RF and LF, and it will be realized that both wheel motors M3 and M4 will rotate the right-wheel RW and left-wheel LW to move the pump forwardly. Tilting the switch assembly in the opposite direction, normally toward the operator who usually faces the machine, will close the circuits through the switches LR and RR to reverse the operation and move the pump backwardly. Similarly, tilting the switch to the left will close circuits to the switches RF and LR, to cause the left whel LW to reverse and RW to turn forwardly, thereby swinging the pump around a substantially fixed pivot toward the left. Similarly, tilting the switch assembly toward the right will close the circuits through the switches LF and RR to cause wheel LW to go forward and wheel RW to reverse, to turn the machine toward the right. Tilting the switch to any mid-way position between those described will cause one wheel only to be actuated in the direction of pointing the switch assembly, which swings the feed disc 5 on an arc of greater radius.

A switch K6 of the normally open pushbutton type is included in the switch assembly and connected in line L4, the switch being so located that it may be conveniently held in closed position by the operator when he desires to move the pump in any direction. The purpose of this switch is to make the wheel motor controls inoperative except when it is closed to prevent accidental movement of the apparatus if the operator desires to leave the pump in operation and place the switch assembly at any convenient point, at which time all of the circuits through the mercury type switches will be opened. The switch K6 closes a circuit through a control line C2 common to each of the mercury type switches.

Switch RF includes a second line C3 which closes a circuit through the forward actuating coil A1 of the starter S3, the circuit being closed when the switch RF is tilted from the position illustrated. Switch LF includes a second line C4 which closes a circuit through the forward actuating coil A2 of the starter S4, to drive the motor M4 forwardly, as above described. Switch LR includes a second line C5 which energizes the reverse actuating coil A3 to close the reversing section of starter S4 to cause the motor M4 to reverse and rotate wheel LW in the reverse direction. Switch RR includes a second line C6 which energizes a circuit through the reverse actuating coil A4 to close the reversing section of starter S3.

The operation of the apparatus will be generally apparent from the foregoing. Assuming that the pump is to be used for unloading boxcars of cement, the operator holds the pushbutton switch K6 in closed position and tilts the switch assembly in the necessary directions to cause the pump to move from the platform into the car and advance to a point where the feed disc 5 enters the stored cement. He then opens the air supply to air-ring 16 through the cocks 17 and 18 and immediately closes switch K2 to start motors M1 and M2. Further operation merely involves tilting the switch assembly to cause the pump to keep in contact with the material, with the feed disc 5 wholly or partially submerged. The maximum capacity rate is maintained by tilting the switch alternately to the right and left at frequent intervals, as the pump advances, to cause the feed disc to swing about relatively wide arcs to recover the material over a relatively wide area. The rod 12 assists in breaking down the face of the pile so that the feed disc will undermine the cement and move it rapidly into the hood 4 where it is picked up by the screw flights 15. When heavy slides of cement descend upon the feed disc, and particularly when the cement has been stored for a considerable period and is densely compacted, the screw shaft driving motor M1 may be overloaded. When this overload equals the setting of relay R1, the contacts K1 are opened thereby deenergizing the holding or actuating coil of starter S2, the latter releasing and stopping motor M2. As the flow of material into the hood 4 decreases the motor load falls, releasing the contactor of relay R1 to close the circuit through the contacts K1 and the actuating coil of starter S2, to start motor M2.

The thermal overload relays R protect motor M1 from too frequent overloading. The wheel motors M2 and M4 have sufficient power to move the machine under all normal conditions, and the pump may be moved forwardly against the stored cement until these motors are stalled, when if the operator fails to tilt the switch assembly to open the switches RF and LF, the thermal overload relays, such as at R3, open the circuits, thereby protecting the motors.

The starters are preferably arranged on a panel 80, which may be enclosed in a suitable dustproof casing (not shown). The panel is provided with a thermal block 81 to which the wires of cable 82 may be connected, the cable terminating in a terminal block 83 secured to the pump. A second terminal block 84 is provided for a cable 85 including the control circuit wires, the cable terminating in the remote control switch assembly.

It will be understood from the foregoing that the operator can force the pump into the cement at all times to maintain a maximum rate of pumping without damage to the apparatus or causing the motors to be dangerously overloaded. When the operation is to be stopped for a considerable time, switch K2 is opened, non-return valve 25 closes by gravity and its position against the seat is determined by crank 28. Air is then admitted by the operator, through three-way cock 17, to the conduit until the latter has been cleared of material, as indicated by a transport line pressure gauge 77, on panel 78, when the gauge shows a lack of back-pressure. This gauge is connected by suitable tubing (not shown) to the body of the non-return valve and also serves to indicate the operating pressure of the pipe line system when the apparatus is in normal operation. A second gauge 79 may be arranged on the panel and connected to the air connection 19 beyond the cock 18, to indicate the air-ring supply pressure.

I claim:

1. Apparatus for conveying pulverulent material, comprising the combination of a casing having an open end for the admission of material, a conveyor within the casing, an electric motor for driving the conveyor, a magnetic starter for said motor, a feeder for delivering material to the open end of the casing, a second electric motor for driving the feeder, a magnetic starter for the second motor, the starters being independently connected to a common power supply, and means for stopping the second motor when the first motor is overloaded to a predetermined limit comprising an instantaneous magnetic relay having contacts in the actuating-coil circuit of the starter for the second motor, a contactor to close the contacts, and a coil in the power circuit of the first motor to move the contactor from the contacts and de-energize the actuating-coil to release said starter, the contactor being released by the coil to close the contacts and energize the actuating-coil when the load of the first motor decreases to a safe operating load.

2. Apparatus for conveying pulverulent material stored in bulk on a floor, comprising the combination of an inclined casing having an open end for the admission of material and an offset discharge elbow connected to the other end of the casing, a screw shaft within the casing and extending through a wall of the elbow, an electric motor for driving the shaft, a magnetic starter for said motor, a feeder for delivering material to the open end of the casing, a second motor for driving the feeder, a magnetic starter for the feeder motor, the starters being independently connected to a common power supply, a magnetic overload relay having contacts in the actuating-coil circuit of the starter for the feeder motor, a contactor to close the circuit through the contacts, and a coil in the power circuit of the first motor to move the contactor to open the contacts to de-energize the actuating-coil of the feeder motor starter when an overload of the first motor reaches a predetermined limit.

3. Apparatus for conveying pulverulent material stored in bulk on a floor, comprising the combination of an inclined casing having an open end for the admission of material and an offset discharge elbow connected to the other end of the casing, a screw shaft within the casing and extending through a wall of the elbow, an electric motor for driving the shaft, a feeder for delivering material to the open end of the casing, a second motor for driving the feeder, a magnetic starter for each motor, a pair of auxiliary contacts closed by the starter of the first motor to close a circuit through the actuating-coil of the starter of the feeder motor, a magnetic overload relay having contacts in said actuating-coil circuit, a contactor to close the circuit through the contacts, and a coil in the power circuit of the first motor to move the contactor and open the contacts to de-energize the actuating-coil of the starter to stop the feeder motor when an overload of the first motor reaches a predetermined limit.

4. Apparatus for conveying pulverulent material stored in bulk on a floor, comprising the combination of an inclined casing having an open end for the admission of material and an offset discharge elbow connected to the other end of the casing, a screw shaft within the casing and extending through a wall of the elbow, an electric motor for driving the shaft, a feeder for delivering material to the open end of the casing, a second motor for driving the feeder, a magnetic starter for each motor, a switch actuated by air pressure in the actuating-coil circuit of the first motor, a pair of auxiliary contacts closed by the starter of the first motor to close a circuit through the actuating-coil of the starter of the feeder motor, a magnetic overload relay having contacts in said actuating-coil circuit, a contactor to close the circuit through the contacts, and a coil in the power circuit of the first motor to move the contactor and open the contacts to de-energize the actuating-coil of the starter to stop the feeder motor when an overload of the first motor reaches a predetermined limit.

5. Apparatus for conveying pulverulent material stored in bulk on a floor, comprising the combination of an inclined casing having an open end for the admission of material and an offset discharge elbow connected to the other end of the casing, a screw shaft within the casing and extending through a wall of the elbow, an electric motor for driving the shaft, a feeder for delivering material to the open end of the casing, a second motor for driving the feeder, a magnetic starter for each motor, a manually operated switch in the actuating-coil circuit of the first starter, a pair of auxiliary contacts in the actuating-coil circuit of the second starter closed by the first starter when it reaches its closed position, whereby closing the manually operated switch starts both said motors, a magnetic overload relay having contacts in the actuating-coil circuit of the feeder motor, a contactor to close said contacts and a coil in the power circuit of the first motor to move the contactor and open the circuit thrugh the contacts when an overload of the first motor reaches a predetermined limit.

6. Apparatus for conveying pulverulent material comprising the combination of a casing having an open end for the admission of material, a screw shaft within the casing, an electric motor for driving the shaft, a feeder for delivering material to the open end of the casing, a second motor for driving the feeder, a magnetic starter for each motor, the starters being independently connected to a common power supply, means to close a circuit through the actuating-coil of the starter of the feeder motor when the starter of the first motor is closed and to open said circuit when the starter for the first motor is opened, a magnetic overload relay having contacts in said actuating-coil circuit, a contactor to close the circuit through the contacts, and a coil in the power circuit of the first motor to move the contactor and open the contacts to de-energize the actuating-coil of the starter to stop the feeder motor when an overload of the first motor reaches a predetermined limit.

7. Apparatus for conveying pulverulent material, comprising the combination of a casing having an open end for the admission of material, a screw shaft within the casing, means for supplying air under pressure to the apparatus, an electric motor for driving the shaft, a feeder for delivering material to the open end of the casing, a second motor for driving the feeder, a magnetic starter for each motor, the starters being independently connected to a common power supply, means to close a circuit through the actuating-coil of the starter of the feeder motor when the starter of the first motor is closed and to open said circuit when the starter for the first motor is opened, and a switch actuated by air pressure communicated from said air supply means to close when the pressure is at least equal to a predetermined minimum, the switch being in the actuating-coil circuit of the first motor to prevent operation of said motor if the air pressure is below said minimum.

HERBERT S. LENHART.